(12) United States Patent
Satoh et al.

(10) Patent No.: US 11,687,035 B2
(45) Date of Patent: Jun. 27, 2023

(54) DISPLAY PANEL

(71) Applicant: CITIZEN WATCH CO., LTD., Nishitokyo (JP)

(72) Inventors: Shinji Satoh, Yamanashi (JP); Motoyoshi Itoh, Yamanashi (JP)

(73) Assignee: Citizen Watch Co., Ltd., Tokyo (JP)

( * ) Notice: Subject to any disclaimer, the term of this patent is extended or adjusted under 35 U.S.C. 154(b) by 967 days.

(21) Appl. No.: 16/526,796

(22) Filed: Jul. 30, 2019

(65) Prior Publication Data

US 2021/0034017 A1 Feb. 4, 2021

(51) Int. Cl.
*G04B 19/12* (2006.01)
*G04B 19/30* (2006.01)
*G04B 19/06* (2006.01)
*G04C 10/02* (2006.01)
*G04B 19/10* (2006.01)

(52) U.S. Cl.
CPC ........... *G04B 19/12* (2013.01); *G04B 19/065* (2013.01); *G04B 19/10* (2013.01); *G04B 19/30* (2013.01); *G04C 10/02* (2013.01)

(58) Field of Classification Search
CPC ...... G04B 19/10; G04B 19/12; G04B 19/065; G04B 19/06
See application file for complete search history.

(56) References Cited

U.S. PATENT DOCUMENTS

| | | | |
|---|---|---|---|
| 213,350 A * | 3/1879 | Root | G04B 19/065 368/232 |
| 2012/0134243 A1 | 5/2012 | Sonoda | |
| 2013/0070573 A1* | 3/2013 | Oshio | G04B 19/10 368/235 |

FOREIGN PATENT DOCUMENTS

| | | |
|---|---|---|
| JP | 52-085450 U1 | 6/1977 |
| JP | 56-162075 A | 12/1981 |
| JP | 7-34389 U | 6/1995 |
| JP | 2001-296373 A | 10/2001 |
| JP | 2006-220516 A | 8/2006 |
| JP | 2007-107940 A | 4/2007 |
| JP | 4887116 B2 | 2/2012 |
| JP | 2012-117815 A | 6/2012 |

OTHER PUBLICATIONS

Japanese Office Action for 2017-009556 dated Oct. 27, 2020.

* cited by examiner

*Primary Examiner* — Edwin A. Leon
*Assistant Examiner* — Jason M Collins
(74) *Attorney, Agent, or Firm* — Knobbe, Martens, Olson & Bear, LLP (57) ABSTRACT

A display panel includes a plate-shaped decoration member including a shading part and a light transmission part formed within the shading part, as well as a plate-shaped reflection member disposed on a back side of the decoration member. The shading part and the light transmission part create a fine pattern in plan view. The reflection member is configured to reflect light. The decoration member is disposed on a front surface of the reflection member.

12 Claims, 7 Drawing Sheets

FIG.14

DISPLAY PANEL

BACKGROUND

Technical Field

The disclosure relates to a display panel.

Description of Related Art

Various types of decoration may be applied to a display panel such as a timepiece dial. For example, Japanese Patent No. 4,887,116B (hereinafter referred to as "PLT 1") teaches to decorate a display panel with Japanese papers called Washi.

SUMMARY

The present disclosure provides a display panel which includes a plate-shaped decoration member including a shading part and a light transmission part formed within the shading part, as well as a plate-shaped reflection member disposed on a back side of the decoration member. The shading part and the light transmission part create a fine pattern in plan view. The reflection member is configured to reflect light. The decoration member is disposed on a front surface of the reflection member. As a result, the display panel is capable of improving sharpness of a fine pattern created by the shading part and the light transmission part formed therebetween.

DETAILED DESCRIPTION

Hereinafter, an embodiment of a display panel according to the disclosure will be described with reference to the drawings.

Figure 1:
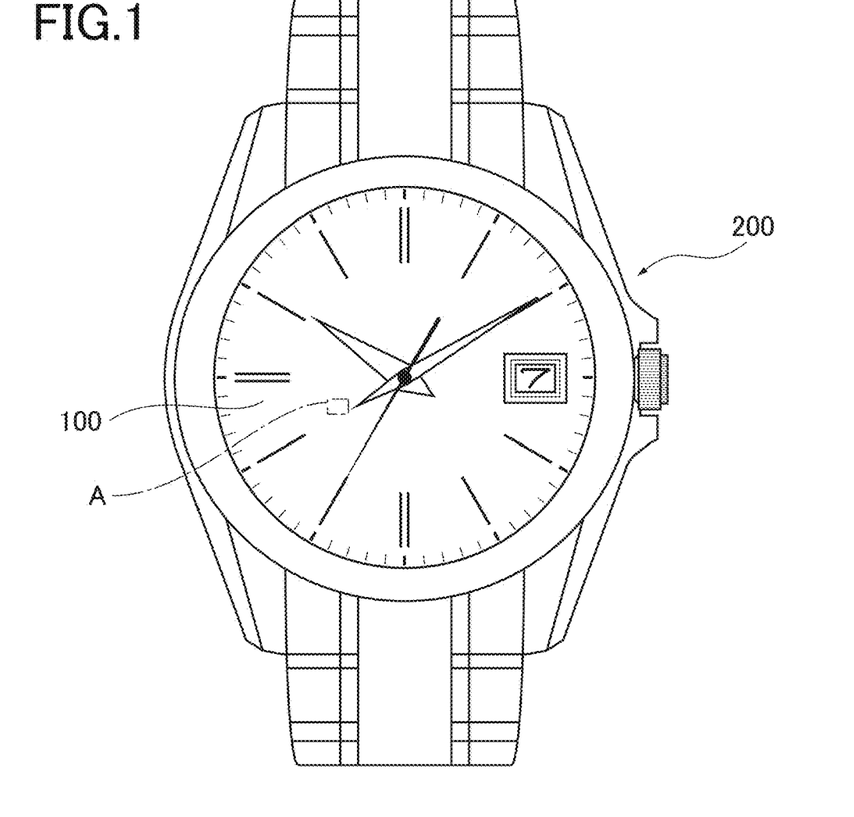
FIG. 1 is a plan view showing a timepiece including a dial, the dial being an example of the display panel of the disclosure.

As shown in FIG. 1, a dial 100 of the embodiment is applicable to a timepiece 200. In this embodiment, the display panel of the disclosure includes numeric indexes and/or bar indexes and is applied to the timepiece 200 as the "dial". The display panels of the disclosure are, however, not limited to plates applied to timepieces. That is, the display panels of the disclosure are not limited to dials.

Figure 2:
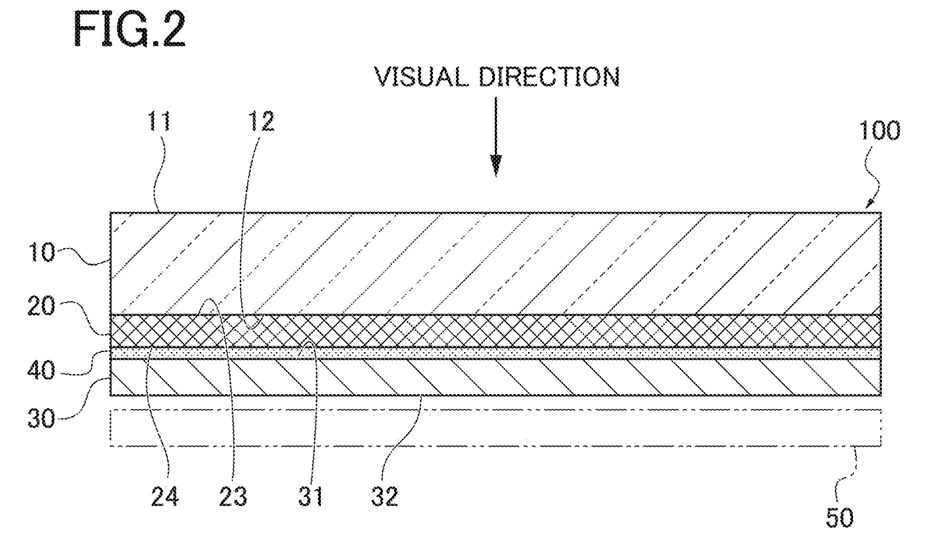
FIG. 2 is a cross-section view of the dial of FIG. 1.

As shown in FIG. 2, the dial 100 are laminated with, in the order from the viewer side to the bottom, a transparent upper plate 10, a Washi (Japanese paper) layer 20, and a reflection plate 30 in a direction orthogonal to the dial. In the disclosure, the transparent upper plate 10 is an example of a transparent member, the Washi 20 is an example of a decoration member, and the reflection plate 30 is an example of a reflection member. The transparent upper plate 10 is made of a colorless and transparent resin, and has a front surface and a back surface be flat. The transparent upper plate 10 is transparent to light in the visible range. In this disclosure, the term "front" means the viewer side, and the term "back" means the side opposite to the viewer side.

Figure 3:
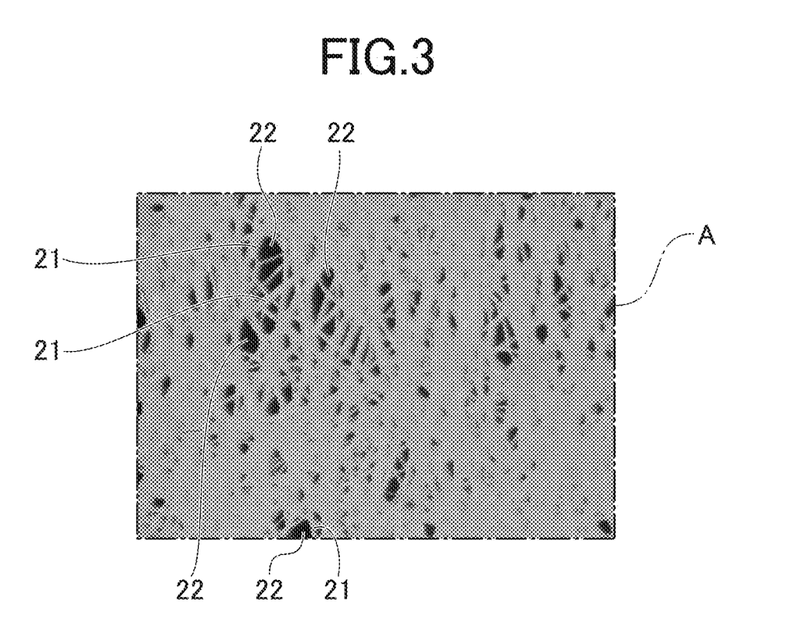
FIG. 3 is a partial enlarged view of a part A indicated in FIG. 1.

The Washi 20 is formed by irregularly arranging and laminating fibers or bundles of fibers (hereinafter, collectively referred to as "fibers") so as to have a plate-like shape with a thickness of, for example, several tens of micrometers. The fibers in this disclosure are made of, for example, plant fibers and are opaque to light in the visual light range. As shown in FIG. 3, the fibers of the Washi 20 forms a shading part 21 in plan view. As the fibers of the Washi 20 are irregularly arranged and entangled with each other, and the gaps created between the fibers form a light transmission part 22 which allows light in the visible range to pass through in plan view.

Figure 5:
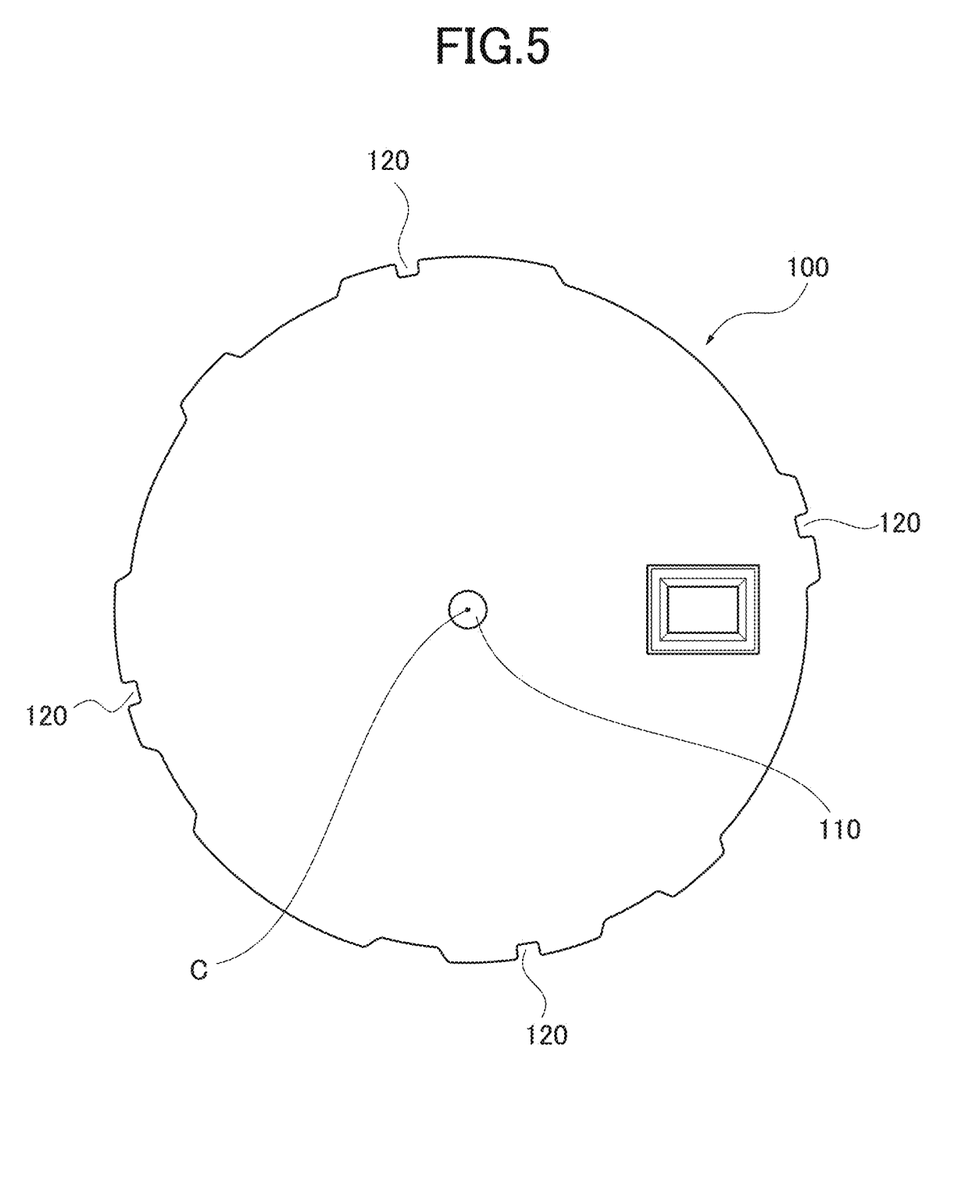
FIG. 5 is a plan view of the dial.

The circumferential outline of the Washi 20 and the outline of a through-hole 110 illustrated in FIG. 5 are formed by irradiating a laser beam. That is, the circumferential outline of the Washi 20 and the outline of the through-hole 110 are cut by a laser beam. Due to the fact, an edge portion of the Washi 20 may be burnt out. Unlike cutting process with a pressing machine, no shear force is applied to the fibers when cutting the fibers. Therefore, it prevents the fibers from being frayed easily.

The Washi 20 forms a fine pattern in plan view with the shading part 21 being formed of fibers and the light transmission part 22 being gaps. It should be noted the term "fine" in this disclosure means a dimension which is, for example, equal to or smaller than 1 mm but is large enough to be recognized as a pattern. The Washi 20 is an example of a decoration member to decorate the timepiece 200 with the fine pattern.

The reflection plate 30 has a thickness of, for example, 150 μm and reflects the incident light in the visible range entered through the light transmission part 22 of the Washi 20. The reflection plate 30 has a front surface 31 on the viewer side and a back surface 32 on the other side, and both of the front surface 31 and the back surface 32 are formed flat. The reflection plate 30 reflects a part of the incident light on the front surface 31 while passes a part of the incident light to inside of the timepiece 200 and emits the light from the back surface 32.

The reflection plate 30 has, for example, a laminated structure comprising hundreds of resin layers. Each of the resin layers may have a different refractive index and has a thickness in the nanometer-order. The front surface 31 of the reflection plate 30 is a mirror finished surface to reflect a part of the incident light, and the rest of the light entered through the front surface 31 is reflected at each interface of the resin layers having different refractive indexes from each other. With this, the reflection plate 30 achieves metallic gloss with resin. Additionally, as the reflection plate 30 does not include a metallic vapor deposition film, the reflection plate 30 has a high transmittance of radio waves.

With the reflection plate 30 having a light transmittance, the dial 100 is configured such that at least a part of the light incident to the dial 100 from the outside is guided to the back surface 32 of the reflection plate 30. Further, the dial 100 allows the light entered from the reflection plate 30 to guide to the front surface 31 of the reflection plate 30. The dial 100 has a light transmittance of, for example, 15% or more.

The timepiece 200 of this embodiment comprises a solar cell 50 on the back side of the reflection plate 30 to generate power from the light irradiated to the solar cell 50. The incident light entered the dial 100 from the outside passes through the reflection plate 30 and irradiates the solar cell 50. The timepiece 200 is driven by the power generated by the solar cell 50.

The timepiece 200 may comprise a lighting device on the back side of the reflection plate 30 instead of the solar cell 50. The light emitted from the lighting device is thus guided from the backside of the reflection plate 30 to the viewer side through the reflection plate 30 and the front surface 31. It should be noted if the timepiece 200 does not comprise a solar cell 50 and a lighting device, the reflection plate 30 of the dial 100 does not have to have a light transmittance since there would be no need to pass the light through the reflection plate 30.

The Washi 20 is provided on the front surface 31 of the reflection plate 30. To be specific, the back surface 24 of the Washi 20 is adhered to the front surface 31 of the reflection plate 30 via an adhesive 40 applied to the front surface 31 of the reflection plate 30. The thickness of the adhesive 40 is set thinner than the thickness (i.e., dimension from front surface 23 to back surface 24) of the Washi 20. The front surface 23 of the Washi forms a non-adhesive area in which no adhesive 40 is impregnated.

As the adhesive 40 is applied to the front surface 31 of the reflection plate 30, a layer of the adhesive 40 is formed between the back surface 24 of the Washi 20 and the front surface 31 of the reflection plate 30. That is, the back surface 24 of the Washi 20 and the front surface 31 of the reflection plate 30 may not be completely contacted each other. However, the back surface 24 and the front surface 31 are substantially and technically contacted each other, and therefore it should be understood to a person skilled in the art that the Washi 20 is provided on the front surface 31 of the reflection plate 30.

The Washi 20 is preferably provided on the reflection plate 30 such that the back surface 24 of the Washi 20 comes into direct contact with the front surface 31 of the reflection plate 30 at least partially. Owing to the configuration, the shading part 21 of the Washi 20 is placed close to the reflection surface (i.e., front surface 31 of reflection plate 30). As a result, it allows the viewer (user of timepiece 200) to easily recognize a reflected image of the shading part 21 formed by the reflection surface.

Here, the drawing of FIG. 2 shows a configuration in which the back surface 24 of the Washi 20 and the front surface 31 of the reflection plate 30 are not directly contacted each other. However, FIG. 2 was drawn to facilitate understanding and to let easily recognize the applied adhesive 40.

The adhesive 40 is, for example, a hot-melt adhesive. Hot-melt adhesives melt at 80 to 100 Celsius degree and functions as glues. Hot-melt adhesives are, for example, a form of thermoplastic such as ethylene-vinyl acetate. As the hot-melt adhesive is solidified by reducing the temperature, it is preferable to control the penetrance of the adhesive into the Washi 20.

Figure 4:
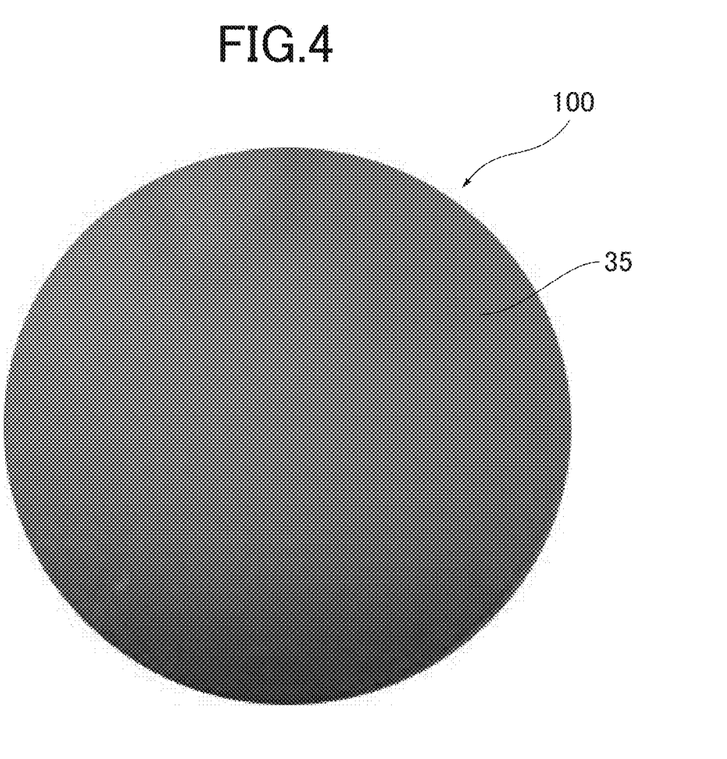
FIG. 4 is a cross-sectional view schematically showing a cutting surface of the timepiece of FIG. 1 in the thickness direction.

The back surface of the transparent upper plate 10, which is disposed close to the viewer side than the Washi 20, is in close contact with the front surface 23 of the Washi 20. Here, the structure in which the transparent upper plate 10 being in close contact with the Washi 20 means the transparent upper plate 10, Washi 20 and the reflection plate 30 are clamped by a case 210 and a movement 230 of the timepiece 200 when the timepiece 200 is assembled, as shown in FIG. 4.

That is, the Washi 20 and the reflection plate 30, which are integrally combined by the adhesive 40, are disposed on the top surface of the movement 230 of the timepiece 200, and the transparent upper plate 10 is disposed on the front surface 23 of the Washi 20. The assembled part (i.e., transparent upper plate 10, Washi 20, reflection plate 30, and movement 230) is then inserted into the inside of the case 210 through an opening formed on the back side of the case 210. By sealing the opening with a back cover 220, the dial 100 is clamped by the case 210 and the movement 230 in the thickness direction. As a result, the back surface 12 of the transparent upper plate 10 and the front surface 23 of the Washi 20 are in close contact with each other.

As shown in FIG. 5, the through-hole 110 is formed at each center of the Washi 20, the reflection plate 30 and the transparent upper plate 10. The through-hole 110 is formed such that a pointer shaft protruded from the center C of the movement 230 is inserted. As is known, pointers such as a hour hand and a minute hand are fixed to the pointer shaft.

Figure 6:
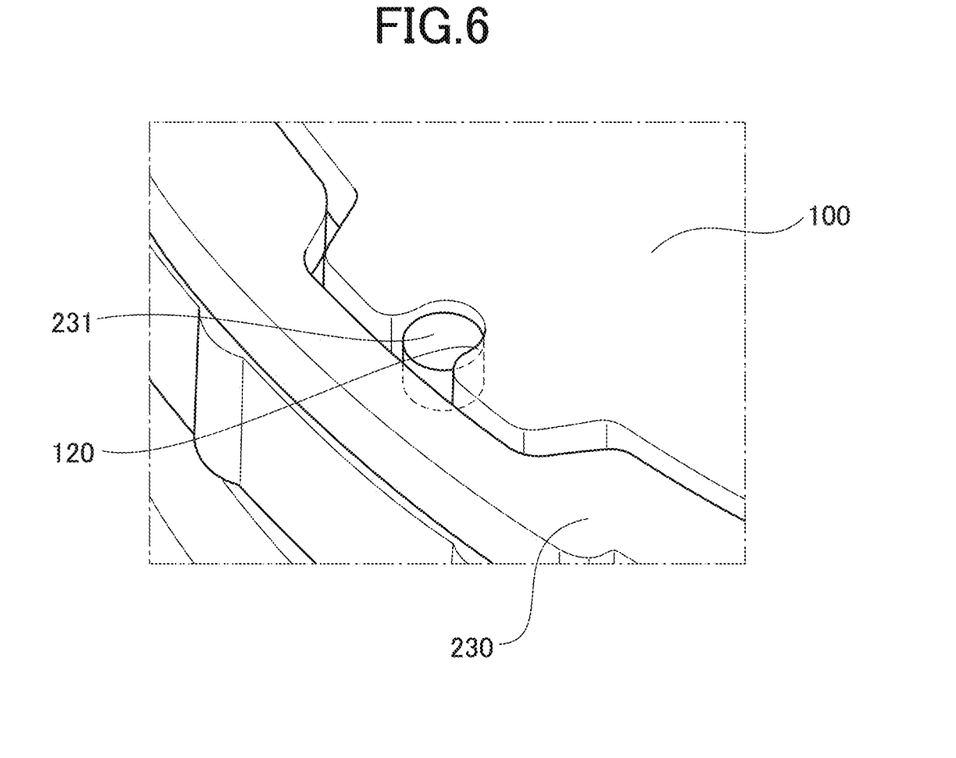
FIG. 6 is a partially enlarged perspective view showing a condition in which a boss of a timepiece movement is engaged with a recess of the dial.

Each outer circumferential edge of the Washi 20, the reflection plate 30 and the transparent upper plate 10 is formed with recesses 120 with which bosses 231 formed on the movement 230 are engaged (see FIG. 6). The movement 230 has four bosses 231 at rotation angle positions around the center C corresponding to the positions of the four recesses 120.

The Washi 20, the reflection plate 30 and the transparent upper plate 10 are assembled to the case 210 by inserting the pointer shaft into the through-holes 110 thereof and by engaging the four bosses on the movement 230 with the corresponding four recesses 120. As a result, the Washi 20, the reflection plate 30 and the transparent upper plate 10 are assembled to the case 210 while being positioned in the circumferential direction around the center C with respect to the movement 230. The opening at the upper part of the case 210 is sealed by a windshield 240. The aforementioned solar cell 50 is provided on the movement 230.

With the dial 100 having the above described configuration, the entire front surface 31 of the reflection plate 30 functions as a reflection surface. Therefore, the light entered from the viewer side is reflected at the front surface 31 of the reflection plate 30 and illuminate the Washi 20 from the back surface 24. This makes the dial 100 appear bright to a viewer of the dial 100. Additionally, with the illumination to the back surface 24 achieved by the reflection light, the contrast of the Washi 20 between the shading part 21 and the light transmission part 22 becomes large. As a result, it is possible to clearly show the viewer the fine pattern formed with the shading part 21 and the light transmission part 22.

When the Washi 20 is separated from the front surface 31 of the reflection plate 30, an image of the shading part 21 formed on the reflection plate might be seen by a viewer through the light transmission part 22. The viewer therefore sees the image of the shading part 21 which is directly delivered to his/her eyes without being reflected at the reflection plate 30 as well as the image of the shading part 21 which is delivered to his/her eyes through the light transmission part 22 after being reflected at the reflection plate 30. As a result, the image of the shading part 21 looks doubled or blurred and thus becomes unclear. The display panel of the PLT 1 comprises a Washi and a reflection type polarizing plate with a transparent substrate disposed therebetween. As the Washi and the reflection type polarizing plate of the PLT 1 are separated from each other by the transparent substrate, the image of the shading part 21 would be doubled or blurred, thereby becoming unclear compared to the display panel 100 shown in FIGS. 1-6.

Contrary to the panel of PLT 1, the dial 100 of the embodiment is configured such that the Washi 20 is substantially in contact with the reflection surface (i.e., front surface 31) of the reflection plate 30. Therefore, the image of the shading part 21 of the Washi 20 would hardly be reflected at the front surface 31. Especially, when the dial is viewed in a direction substantially perpendicular to the dial 100, the reflected image of the shading part 21 can hardly be seen from the light transmission part 22. For this reason, the dial 100 of the embodiment is capable of showing a fine pattern created by the fibers and gaps of the Washi 20 to a viewer clearly.

The dial 100 of the embodiment exemplarily utilizes the Washi 20 as the decoration member. That is, the fibers of the Washi 20 are used as the shading part 21 and the gaps between the fibers are used as the light transmission part 22. Accordingly, the fibers of the Washi 20 are effectively viewed, and the texture of the Washi 20 is effectively recognized by the viewer.

In the dial 100 of the embodiment, the fibers forming the shading part 21 are irregularly arranged and also laminated in the thickness direction. As power generation region of the solar cell 50 is divided into a plurality of regions, the outlines of the regions may include straight lines and/or curves, and such outlines may be extended along a line connecting 12 o'clock and 6 o'clock and/or a line connecting 3 o'clock to 9 o'clock of the dial 100. However, these outlines of the solar cell 50 are camouflaged by the irregularly-arranged fibers of the Washi 20. As a result, it is possible to disguise the presence of the solar cell 50.

In the dial 100 of the embodiment, the transparent upper plate 10 is disposed on the Washi 20 and is in close contact with the Washi 20. Accordingly, it is possible to prevent or suppress the fibers on the front surface 23 of the Washi 20 from being frayed. Even if the fibers of the Washi 20 come out or are loosened, the loosened fibers would be pressed and held by the transparent upper plate 10 onto the front surface 23 of the Washi 20. Therefore, it prevents the loosened fibers from moving on the dial 100 or from moving around the space above the dial 100.

The Washi 20 and/or the reflection plate 30 may be formed to be like a very thin film. On the other hand, the rigidity thereof becomes less reliable. However, since the dial 100 of the embodiment comprises the transparent upper plate 10, the timepiece 200 of the embodiment has the overall rigidity higher than a timepiece without the transparent upper plate 10.

In the dial 100 of the embodiment, the pointer shaft of the movement 230 is inserted into the through-hole 110 formed on the dial 100, and the dial 100 is applied to the timepiece 200 in which the pointers are fixed to the pointer shaft. Since the pointer shaft rotates, the fibers of the Washi 20 may be frayed and loosened when the fibers are caught by the rotating pointer shaft. If the dial 100 did not have the transparent upper plate 10, the loosened fibers would be caught by the pointer shaft and/or the pointes and adversely affect the rotation of the pointer shat. Additionally, such loosened fibers would degrade the appearance of the dial 100 of the timepiece.

However, the dial 100 of the embodiment comprises the transparent upper plate 10 being in close contact with the Washi 20. Accordingly, it prevents or suppresses the loosen fibers from being caught by the pointer shaft and/or the pointers or prevents or suppresses the appearance of the dial from being degraded even if the fibers are frayed.

In the dial 100 of the embodiment, the Washi 20 is adhered to the front surface 31 of the reflection plate 30 by the adhesive 40. With this, the Washi 20 and the reflection plate 30 are handled integrally.

In the dial 100 of the embodiment, the front surface of the Washi 20 forms the non-adhesive area in which no adhesive 40 is impregnated. With this, the fibers do not appear to be immersed in the liquid. Therefore, the front surface 23 of the Washi 20, on which no adhesive 40 is impregnated, keeps fluffy texture (i.e., soft and cottony texture) of the fibers.

The dial 100 of the embodiment uses the hot-melt adhesive, and it is easy to control the phase changes between the solid and liquid of the adhesive 40 by controlling the heat applied thereto. For this reason, it is easy to solidify the adhesive 40 in order to avoid the adhesive 40 impregnating the front surface 23 of the Washi 20.

Here, the adhesive 40 may be applied to the entire front surface 31 of the reflection plate 30 so as to adhere the entire back surface 24 or the Washi 20. Alternatively, the adhesive 40 may be applied only to the portions not seen from outside. That is, the adhesive 40 may be applied only to the portions covered by the case 210 or an annular member such as a facing ring. When the adhesive 40 is applied only to the portions not seen from outside, the adhesive 40 may be impregnated to the front surface 23 of the Washi 20.

In the dial 100 of the embodiment, the thickness of the adhesive 40, which is applied to the front surface 31 of the reflection plate 30, is thinner than the thickness of the Washi 20. Therefore, the adhesive 40 is hardly impregnated to the front surface 23 of the Washi 20 even when an adhesive other than hot-melt adhesive is applied.

Variation

The transparent upper plate 10 of the dial 100 in the abovementioned embodiment has flat surfaces on the front surface 11 and the back surface 12. However, the back surface 12 may be formed with an uneven pattern. For example, such an uneven pattern may be a multiple number of concentric grooves or a spiral grooves around the center C, a multiple grooves radially extended from the center C, or a wave pattern.

These grooves may be formed with an extremely shallow depth created by, for example, brushing. With the grooves, the incident light to the dial 100 will be reflected in an intentional pattern. By forming the pattern on the back surface 12 of the transparent upper plate 10, the diffusion effect is reduced by the thickness of the transparent upper plate 10 as compared with the case in which the pattern is formed on the front surface 11. For this reason, it suppresses the fine pattern of the Washi 20 becomes unnoticeable.

Figure 7:
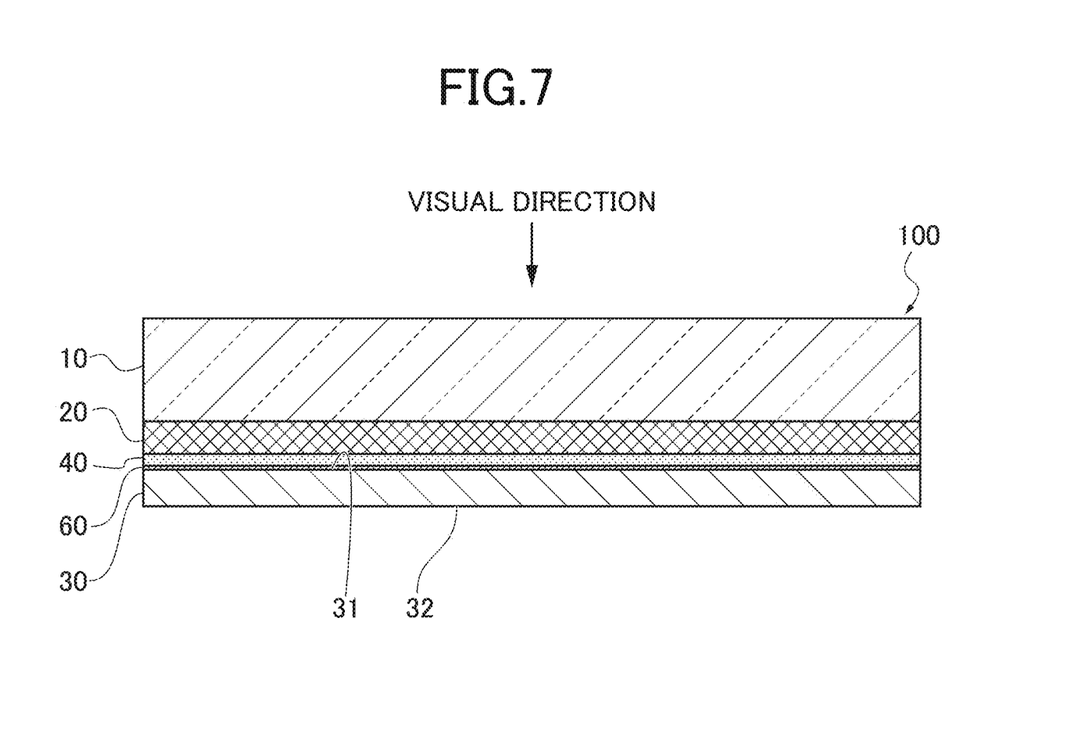
FIG. 7 is a cross-sectional view similar to FIG. 2, showing a dial including a transparent colored layer formed on a front surface of a reflection plate.
Figure 8:
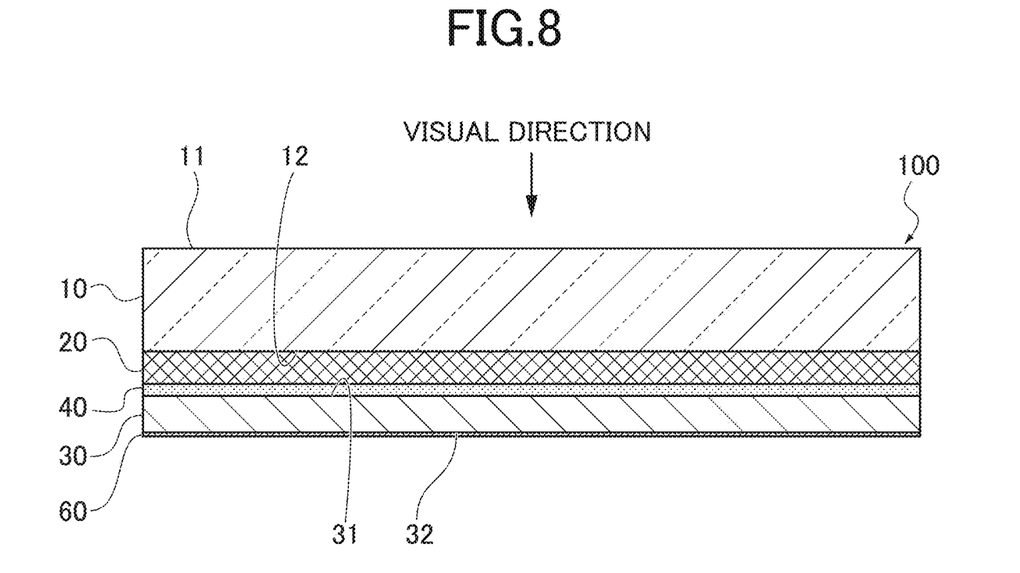
FIG. 8 is a cross-sectional view similar to FIG. 2, showing a dial including a transparent colored layer formed on a back surface of the reflection plate.

As illustrated in FIG. 7, the reflection plate 30 of the dial 100 of the present embodiment may be formed with a colored layer 60 on the front surface 31. Here, the colored layer 60 has a light transmittance. By providing color on the front surface 31 of the reflection plate 30, the color of the dial 100 is selectively changed. Here, the colored layer 60 may alternatively be formed on the back surface 32 of the reflection plate 30, as illustrated in FIG. 8. It is, however, preferable to provide the colored layer 60 on the front surface 31 since the colored layer 60 on the front surface 31 gives clearer and/or darker color impression to the viewer than the colored layer 60 on the back surface 32 does.

That is, when the colored layer 60 is provided on the front surface 31, it is capable of giving clear and/or dark color impression to the viewer even with a colored layer 60 having a low color density. Thus, it is possible to providing dark and/or clear color impression while suppressing the reduction of the transparency. On the other hand, when the colored layer 60 is provided on the back surface 32, it is capable of giving light and/or delicate color impression to the viewer by adding blurring effects on the colored layer 60. For this reason, it is possible to selectively achieve different color effects suitable to the design of the dial 100 with the configurations of the reflection plate 30, the front surface 31 and the back surface 32.

Figure 9:
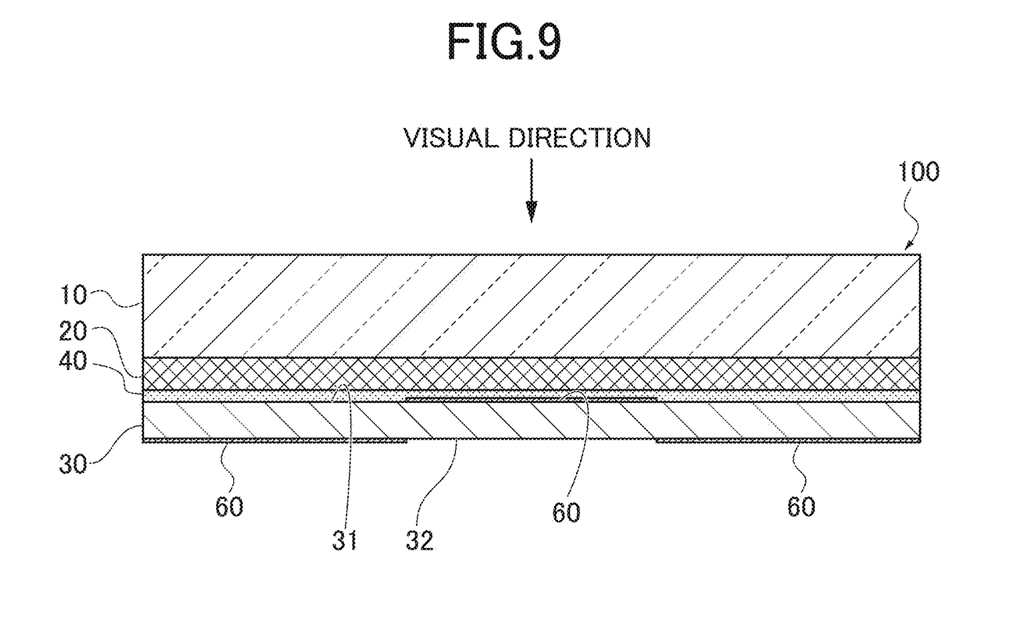
FIG. 9 is a cross-sectional view similar to FIG. 2, showing a dial including transparent colored layers on a part of the front surface of and a part of the back surface of the reflection plate.

As illustrated in FIG. 9, the colored layer 60 may partially be formed on the front surface 31 and the back surface 32 of the reflection plate 30. As described above, the colored layer 60 on the front surface 31 achieves darker and/or clearer color impression than the colored layer 60 on the back surface 32. Further, the colored layer 60 on the back surface 32 achieves lighter and/or more delicate color impression than the colored layer 60 on the front surface 31. Therefore, even with a single color, it provides two different color impressions to the by forming the colored layers 60 on the front surface 31 and the back surface 32, respectively. It should be noted that coloring the dial 100 is not limited to forming the colored layer 60 on the refection plate 30. The coloring the dial 100 may be achieved by coloring the Washi 20 and/or coloring the transparent upper plate 10.

In the dial 100 of the embodiment, the transparent upper plate 10 is disposed closer to the viewer side than the Washi 20. The Washi 20 and the reflection plate 30 are adhered to each other by an adhesive or an adhesive member, and the front surface 23 of the Washi 20 is brought in close contact with the back surface 12 of the transparent upper plate 10. By integrally structuring the dial 100 as mentioned above, the shape of the thin Washi 20 and the reflection plate 30 are supported by the rigidity of the transparent upper plate 10. As a result, the dial 100 itself (i.e., prior to being assembled with the timepiece 200) is able to keep and maintain its form rigidly.

Figure 10:
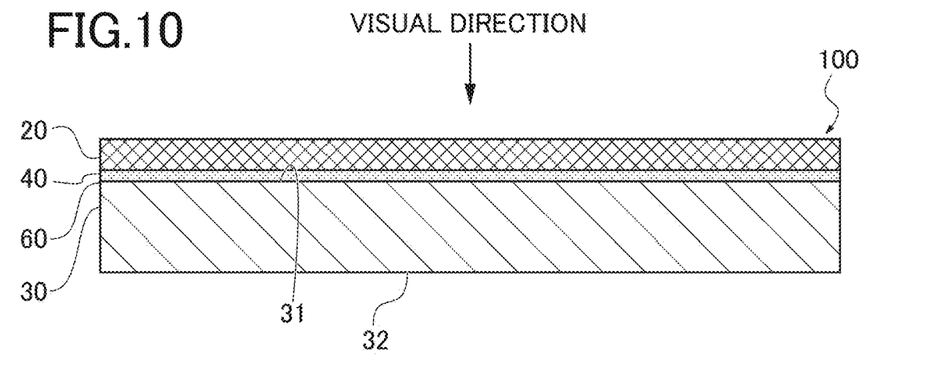
FIG. 10 is a cross-sectional view similar to FIG. 2, showing a dial without a transparent upper plate on a view side of a Washi.

The dial 100 of the embodiment may be configured to solely maintain the rigid form without including the transparent upper plate 10. In this configuration, the reflection plate 30 of the dial 100 has the thickness such that the rigidity of the reflection plate 30 is approximately the same as that of the transparent upper plate 10, as illustrated in FIG. 10. When there is no requirement on the transparency of the reflection plate 30, vapor deposition or plating of opaque metal may be applied to the front surface 31 of the reflection plate 30 so as to form the reflection surface. Alternatively, the reflection plate 30 itself may be made of an opaque resin or metal.

In the dial 100 without the transparent upper plate 10 on the viewer side relative to the Washi 20, the viewer directly sees the front surface 23 of the Washi 20 without the transparent upper plate 10. For this reason, the dial 100 in which the pattern of the *Wash* 20 is viewed by the viewer clearly is provided.

Figure 11:
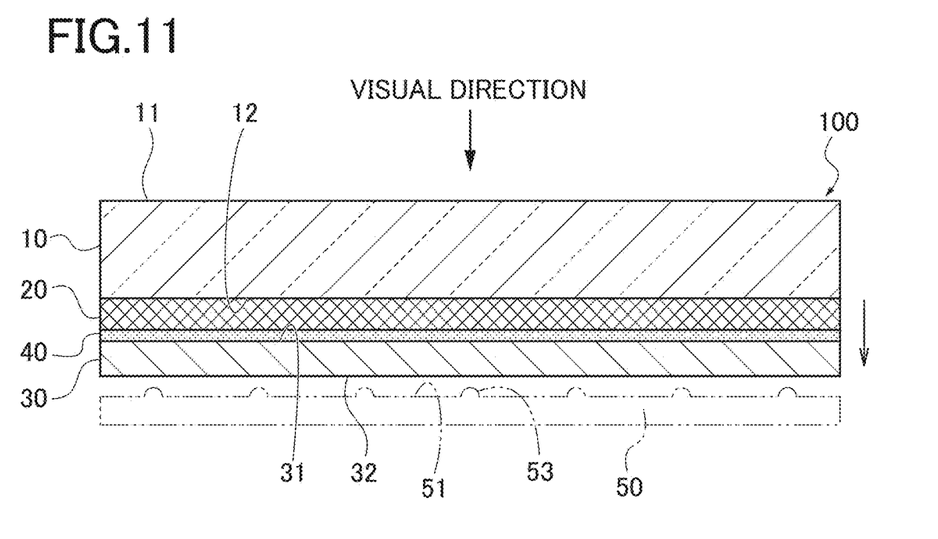
FIG. 11 is a cross-sectional view similar to FIG. 2, showing a dial prior to pressing the reflection plate onto a plurality of micro projections formed on a light receiving surface of a solar cell.

The dial 100 of the embodiment is applied to the timepiece 200 which comprises the solar cell 50 on the back side of the dial 100. The solar cell 50 has micro projections 53 on, for example, a light receiving surface 51 (i.e., front surface of solar cell 50), as illustrated in FIG. 11. The micro projections 53 may form an amorphous silicon thin film by a plasma Chemical Vapor Deposition (plasma CVD) in an amorphous silicon solar cell. Alternatively, the micro projections 53 may be sputtered marks formed on the surface when forming a transparent electrode such as an Indium Tin Oxide (ITO). The diameter of the micro projections 53 is about several hundred μm or less.

In order to reduce the thickness of the timepiece 200, the dial 100 is disposed to be in contact with the light receiving surface 51 of the solar cell 50. The dial 100 is then held by the case 210 and is pressed to the light receiving surface 51 of the solar cell 50 in a direction indicated by the allow in FIG. 12. As a result, the relative movement between the dial 100 and the solar cell 50 is restricted. That is, the back surface 32 of the reflection plate 30 is pressed onto the micro projections 53 on the light receiving surface 51 of the solar cell 50.

Figure 12:
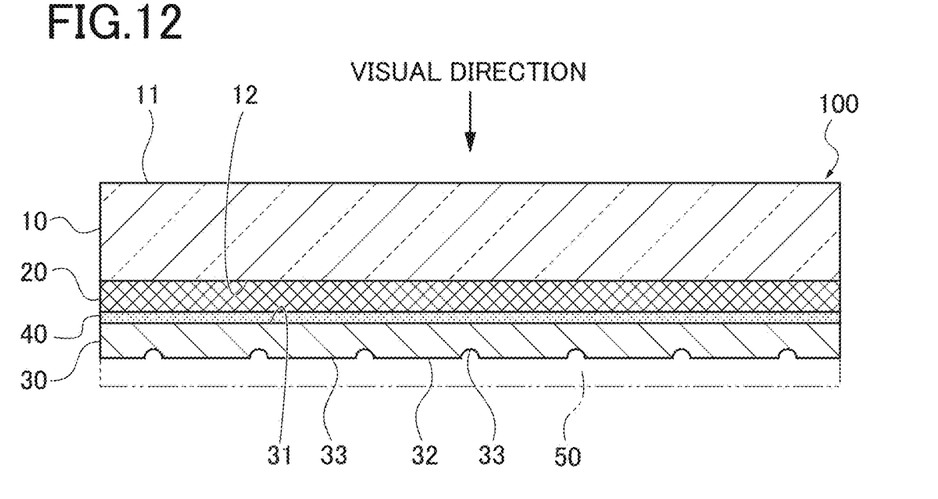
FIG. 12 is a cross-sectional view similar to FIG. 2, showing the dial in which contour shapes of the projections of the solar cell have been transferred to the reflection plate of the dial.

In a case where the reflection plate 30 has a temperature characteristic such that the reflection plate 30 softens under an environment of a predetermined temperature or higher, the contour shapes of the micro projections 53 of the solar cell 50 would be transferred onto the back surface 32 of the reflection plate 30 if the timepiece 200 is left under an environment exceeding the predetermined temperature (e.g., when the timepiece 200 is left inside a closed car cabin during a daytime in summer).

If the contour shapes of the micro projections 53 are transferred onto the back surface 32 of the reflection plate 30, the image of the outlines 33 of the micro projections 53 would be transmitted to the viewer side. However, the image of the outlines 33 are covered by the fine and irregular pattern of the Washi 20 in the dial 100 of the embodiment. Therefore, the image of the outlines 33 would be inconspicuous or unnoticeable to the viewer. Although the micro projections 53 in FIGS. 11 and 12 are illustrated to be formed at equal intervals, the micro projections 53 may be formed at unequal intervals.

Other Variations

As the dial 100 of the embodiment uses the Washi 20 as the decoration member, the fine pattern created by the shading part 21 and the light transmission part 22 is irregularly arranged. However, the fine pattern on the decoration member for the display panel of this disclosure may alternatively be regularly arranged. With a decoration member having an irregularly arranged fine pattern, regularly arranged contour shapes of, for example, a solar cell disposed under the display panel are less noticeable to the viewer.

The outer circumferences and/or the outline of the through-holes 110 (described later and illustrated in FIG. 5)

of the Washi 20 may be formed by means other than laser cutting by press cutting). So long as the cutting means does not create loosened fibers that adversely affect the appearance of the dial 100 and/or the function of the timepiece 200, such cutting means is applicable.

The shading part 21 of the Washi 20 may completely block the light or may partially pass the light.

The Washi 20 is generally composed of plant fibers. However, the Washi 20 may be composed of other fibers such as artificially manufactured cellulose.

Figure 13:
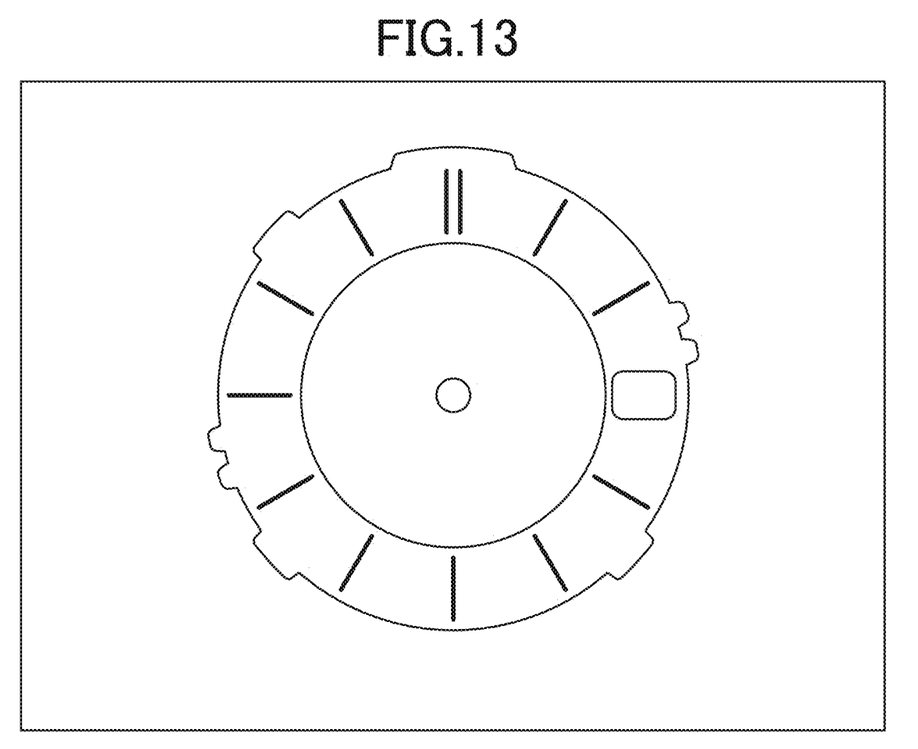
FIG. 13 is a picture showing a nonwoven fabric for a decoration member, the nonwoven fabric being formed with a fine pattern created by, for example fibers and gaps therebetween.

The picture of FIG. 13 shows a disc-shaped transparent upper plate 10 placed on a nonwoven fabric. In the transparent upper plate 10, the round part at the center has a different surface from the outer annular part having hour marks and a calendar window. Therefore, the appearances of the unwoven fabric are different at the round part of and at the annular part of the transparent upper plate 10.

The decoration member of the display panel in this disclosure has a fine pattern created by shading parts and light transmission parts. However, it is not limited to the Washi 20 having the fine pattern created by the fibers or the bundles of fibers and the gaps therebetween. For example, a nonwoven fabric (see FIG. 13) having a fine pattern created by fibers and the gaps therebetween, a lien fabric or a silk fabric woven from fibers, a plate-shaped material made of a number of threads, a bird feather or an insect feather, a plant vein, or the like is even applicable as the decoration member.

The decoration member of the display panel in this disclosure has the fine pattern created by the shading part and the light transmission parts, but it is not limited to a fiber material. For example, a paper, a resin plate, or a metal plate having a pattern created by arranging micro through-holes in a pattern is applicable. Alternatively, the decoration member may be formed by sandwiching the paper, the resin plate, or the metal plate having the pattern with transparent films.

The reflection plate 30 has the front surface 31 that partially reflects the light, and the light is also reflected at each interface of the resin layers having different refractive indexes. However, the light may be reflected at other parts of the reflection plate 30 (e.g., on back surface 32 thereof).

The reflection plate 30 may not have the laminated structure with resins. When the laminated structure with resins is applied to the reflection plate 30, the reflection plate 30 has high radio wave transmissivity or permeability. Therefore, such reflection plate 30 is remarkably effective for a so-called radio timepiece that has a radio-receiving antenna on the back side of the dial 100. On the other hand, when a timepiece does not require radio wave permeability, the reflection plate 30 of the dial 100 may be formed by applying a semi-permeable deposited film (having thickness of about 0.1 μm) onto a front surface 31 of a transparent resin substrate. Such a semi-permeable deposited film may be made of metals, alloys, or oxides of metals or alloys; nitride of metal or alloy; or carbides of metal or alloy.

Alternatively, a front surface 31 of a transparent resin substrate may be coated by a light-reflecting paint. Such the light-reflecting paint may contain powders of metals, alloys, or oxides of metals or alloys; nitride of metal or alloy; or carbides of metal or alloy.

Figure 14:
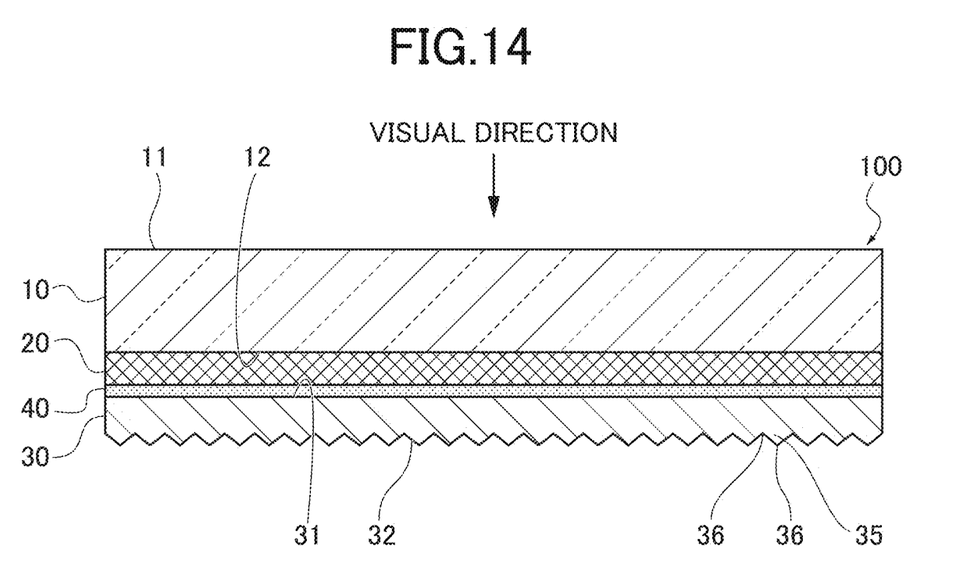
FIG. 14 is a cross-sectional view similar to FIG. 2, showing a reflection plate formed with a large number of minute prisms on a back surface of a resin substrate.

As illustrated in FIG. 14, the reflection plate 30 may be brightness enhancement board in which a large number of minute prisms 36 are formed on the back surface 32 of the resin substrate.

The reflection plate 30 preferably reflects at least a part of the light at the front surface 31 rather than reflecting the light at the back surface 32. When the reflection plate 30 is configured to reflect the light at the back surface 32, the distance between the Washi 20 and the reflection surface increases by the thickness of the reflection plate 30 compared to the configuration in which the light is reflected at the front surface 31. Therefore, if the reflection plate 30 is configured to reflect the light at the back surface 32, the thickness of the reflection plate 30 should be thin enough such that the pattern on the Washi 20 is clearly visible to the viewer.

As the reflection plate 30 in which at least a part of the light is reflected at the front surface 31, the front surface 31 of the reflection plate 30 is a mirror finished surface and the light is reflected at each interface of the resin layers having different refractive indexes. Alternatively, the reflection plate 30 may be formed by applying a vapor deposition film or a light reflection coating to the resin substrate.

The Washi 20 and/or the reflection plate 30 may not be disposed on the entire surface of the dial 100. For example, the Washi 20 may be applied to the area corresponding only to the center portion of the dial 100. With this configuration, the reflection plate 30 is applied to the area at least corresponding to the area having the Washi 20.

The adhesive 40 may be an adhesive having a high viscosity other than a hot-melt adhesive. The Washi 20 and the reflection plate 30 may be adhered to each other by a transparent (light transmitting) double-sided tape or transparent adhesives other than the adhesive 40.

The transparent upper plate 10 may be colored to such an extent that the pattern of the Washi 20 is not visually disturbed. For example, a colored layer may be disposed on the front surface 11 or on the back surface 12 of the transparent upper plate 10. Alternatively, the resin material for the transparent upper plate 10 may be colored. Further alternatively, the adhesive 40 may be colored to achieve the coloring effects.

For the dial 100, it is not necessary to integrally combine the Washi 20 and the reflection plate 30 with the adhesive 40. As described with reference to FIG. 4, the Washi 20 is firmly fixed onto the front surface 31 of the reflection plate 30 when the dial 100 is assembled to the timepiece 200. Thus, the dial 100 may be configured such that the Washi 20 is simply disposed on the front surface 31 of the reflection plate 30 without being adhered by the adhesive 40. With this configuration, at least part of the back surface 24 of the Washi 20 comes in contact with the front surface 31 of the reflection plate 30.

The dial 100 is then clamped by the case 210 and the movement 230 in the thickness direction. As a result, the movement of the Washi 20 relative to the reflection plate 30 is restricted. Therefore, the dial 100 in which the Washi 20 and the reflection plate 30 are integrally fixed to each other is only an example of the display panel of the disclosure.

The term "plate" in this disclosure includes sheets or films having thinner thickness.

The display panel of this disclosure is not limited to the one used in timepieces.

Although the present disclosure has been described in terms of exempla embodiments, it should not be limited thereto. It should be appreciated that variations or modifications may be made in the embodiment described by persons skilled in the art without departing from the scope of the invention as defined by the following claims.

What is claimed is:

1. A display panel comprising:
 a planar decoration member comprising a shading part and a light transmission part formed within the shading part, the shading part and the light transmission part creating a fine pattern in a plan view; and a planar reflection member disposed on a back side of the decoration member, the reflection member being configured to reflect light;

wherein the decoration member is adhered to a front surface of the planar reflection member by adhesive, wherein a front surface of the decoration member is a non-adhesive area in which no adhesive is impregnated, wherein the reflection member has a light transmittance, wherein the display panel is applied to a timepiece, the timepiece comprising a solar cell disposed on a back side of the reflection member, wherein the reflection member is pressed onto a plurality of micro projections formed on a light receiving surface of the solar cell, and wherein the reflection member has temperature characteristics such that the reflection member softens and contours shapes of the micro projections that are transferred onto the back surface of the reflection member under an environment of a predetermined temperature or higher.

2. The display panel according to claim 1, wherein the adhesive is a hot-melt adhesive.

3. The display panel according to claim 1, wherein a thickness of the adhesive is thinner than a thickness of the decoration member.

4. The display panel according to claim 1, wherein the decoration member is disposed on the front surface of the reflection member such that at least a part of a back surface of the decoration member is in contact with the front surface of the reflection member.

5. The display panel according to claim 1, wherein the shading part is formed of fibers or bundles of fibers.

6. The display panel according to claim 5, wherein the decoration member is formed by irregularly arranging and laminating the fibers or the bundles of fibers.

7. The display panel according to claim 5, wherein the decoration member is made of Washi.

8. The display panel according to claim 1, comprising a planar transparent member which is transparent to light, the transparent member being disposed on a viewer side relative to the decoration member such that a front surface of the decoration member being in contact with a back surface of the transparent member.

9. The display panel according to claim 8, wherein the transparent member has an uneven pattern on the back surface of the transparent member.

10. The display panel according to claim 8, wherein the display panel is applied to a timepiece, the timepiece comprising a pointer shaft and a pointer connected to the pointer shaft, wherein the decoration member comprises a through-hole into which the pointer shaft is inserted.

11. The display panel according to claim 1, wherein the front surface of the reflection member is formed with a colored layer having a light transmittance.

12. The display panel according to claim 1, wherein the front surface of the reflection member has a function to reflect at least a part of the light reflected at the reflection member.

* * * * *